United States Patent [19]

Caretta et al.

[11] Patent Number: 4,529,461
[45] Date of Patent: Jul. 16, 1985

[54] PROCESS FOR MANUFACTURING PNEUMATIC TIRES

[75] Inventors: Renato Caretta, Gallarate; Bruno Colombani, Milan, both of Italy

[73] Assignee: Societa' Pneumatici Pirelli Societa per Azioni, Milan, Italy

[21] Appl. No.: 581,739

[22] Filed: Feb. 22, 1984

Related U.S. Application Data

[62] Division of Ser. No. 479,035, Mar. 25, 1983, Pat. No. 4,470,867.

[30] Foreign Application Priority Data

Mar. 30, 1982 [IT] Italy .................. 20467 A/82

[51] Int. Cl.³ .................. B29H 17/26; B29H 17/22; B29H 17/24
[52] U.S. Cl. .................. 156/124; 156/126; 156/132; 156/133; 264/502
[58] Field of Search ........... 156/126, 127, 123, 124, 156/110.1, 131, 132, 133, 128.1, 130, 134, 394.1, 396, 398, 400, 401, 402, 403, 415, 416; 264/502, 501, 339, 259

[56] References Cited

U.S. PATENT DOCUMENTS

| 3,674,604 | 7/1972 | Gazuit | 156/416 X |
| 3,756,883 | 9/1973 | Gay | 156/123 |
| 3,790,425 | 2/1974 | Leblond | 156/127 X |
| 3,929,540 | 12/1975 | Held et al. | 156/126 X |
| 4,206,010 | 6/1980 | Gutknecht | 156/446 X |

Primary Examiner—Edward Kimlin
Assistant Examiner—Thomas Bokan
Attorney, Agent, or Firm—Birch, Stewart, Kolasch & Birch

[57] ABSTRACT

A process and apparatus for the manufacture of pneumatic tires comprising a carcass formed of reinforcing plies and bead cores are disclosed. The tire carcass is built up around a first drum in cylindrical configuration and bead cores are applied to the carcass. The carcass is transferred telescopically to and around a second expandable drum. The carcass is then torically shaped and the ends of the plies turned-up around the bead cores.

6 Claims, 6 Drawing Figures

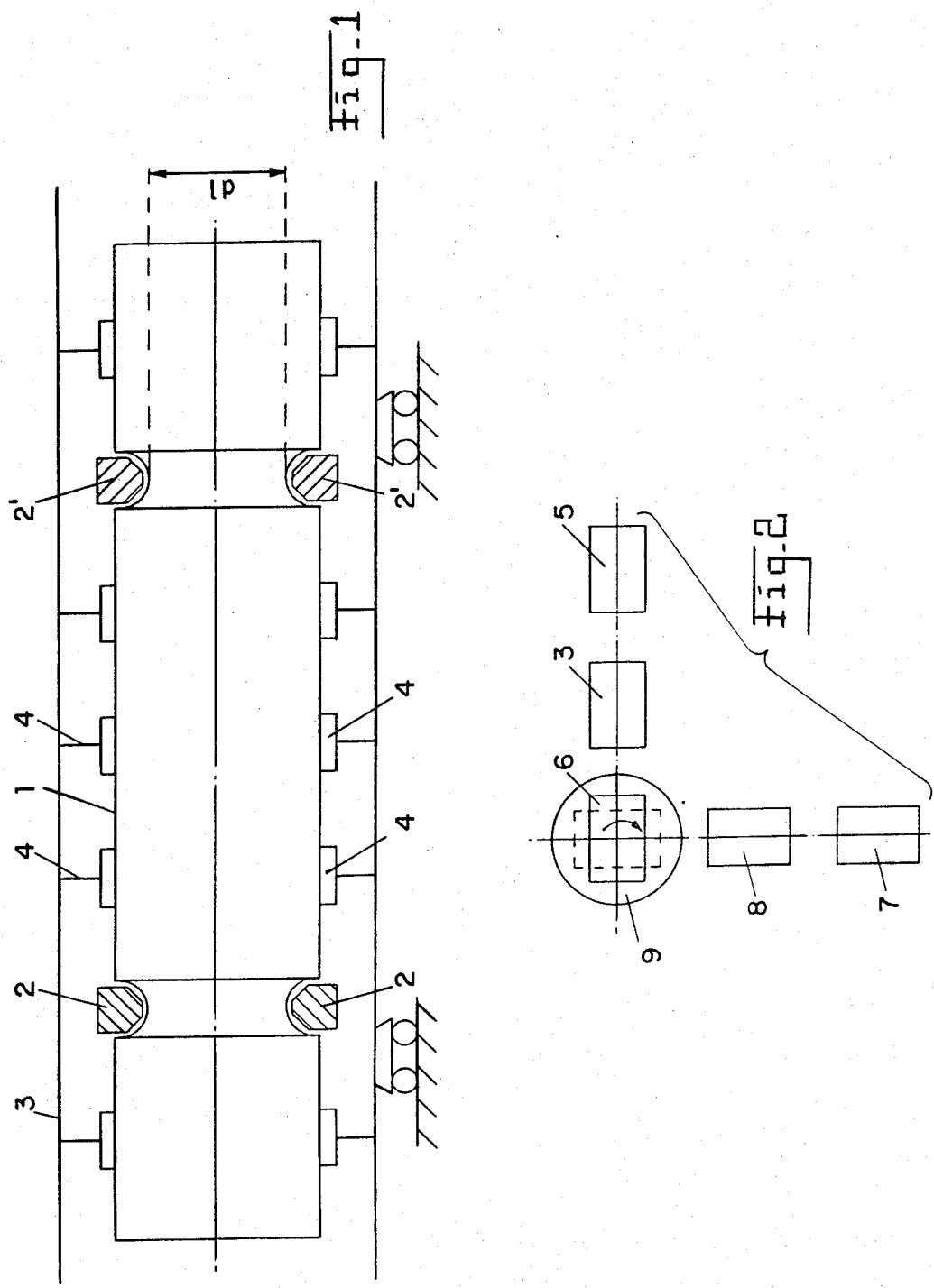

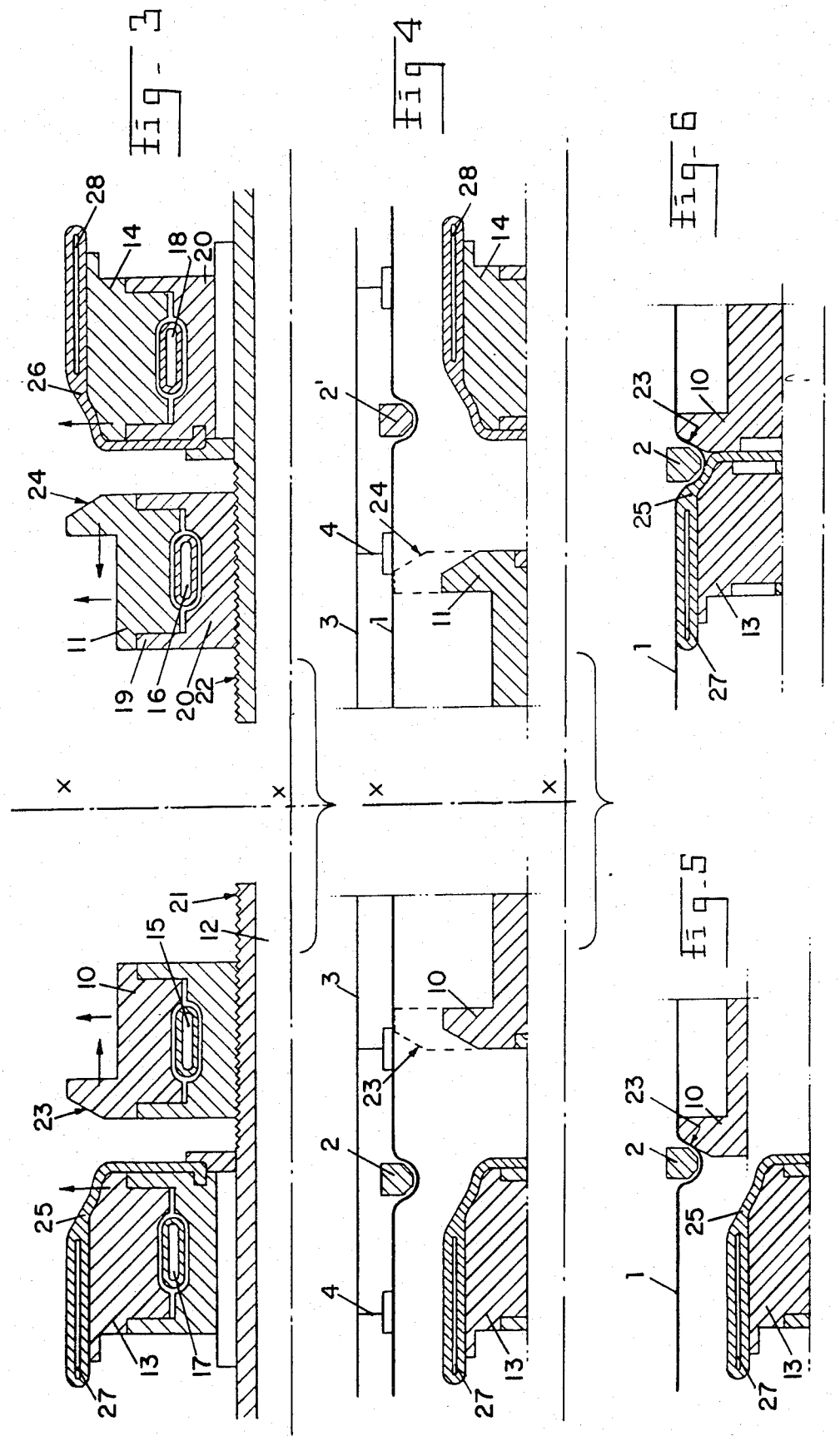

PROCESS FOR MANUFACTURING PNEUMATIC TIRES

This application is a divisional of copending application Ser. No. 479,035, filed on Mar. 25, 1983, now U.S. Pat. No. 4,470,867.

BACKGROUND OF THE INVENTION

The present invention relates to a process and apparatus for manufacturing pneumatic tires and, more particularly, to those steps for manufacturing a pneumatic tire carried out subsequent to the formation of a carcass in a cylindrical configuration.

As is known, a carcass can be made on a single drum arranging the various reinforcing plies in the form of a cylindrical sleeve, then applying the bead cores on the ends of the plies, consequently expanding the suitable seats provided on the drum to oblige the plies to abut around the bead cores and at last expanding the central portion of the drum and drawing simultaneously the bead core seats toward one another to shape the carcass in a toric form. In a further step there is effected the turn-up of the ends of the plies on the sidewalls of the carcass and the application of the reinforcing annular structure and of the tread.

The method can cause, in some cases, an unacceptable skidding of the plies around the bead cores during the step of torically shaping the carcass as a result of the strong tensile stresses on the cords of the plies themselves determined by high inflation pressures. The main skidding cause is bound to a certain bending stiffness of the carcass plies so that the plies themselves do not perfectly abut around the bead cores when the seats of the drum are expanded to determine the anchoring between the plies and the bead cores.

A possible solution to remedy the cited drawback could be that of building up separately the carcass using suitable means designed to faithfully conform the plies around the sides of the bead cores so as to realize a carcass tube to be then transported to an expandable drum to develop the tube from the cylindrical to the toric configuration. However, even if at first glance this procedure appears to be an immediate solution, practically it is considered to give rise to other various problems to be solved all at the same time. First, there is to bear in mind the present inadequacy of the known expandable drums to receive a carcass tube having two sections of reduced diameter at a distance from the ends and in correspondence to the zone of the bead cores. In fact, no solution exists in respect to an automatic loading of a tube having variations in diameter comprising reductions in sections. On the other hand, it is impossible to think of effecting a manual loading of such a tube around a drum of known type, since even admitting to be able to carry out this loading, the carcass would tend to be deformed in the anchoring zones of the plies to the bead cores altering the above-cited faithful coupling and annulling the advantages of making a tube separately. Thus, it is necessary to dispose of appropriate seats on the drum in order to clamp, with the necessary pressure the already preconstituted annular blocks formed by the bead cores with the plies wound on the sides thereof.

Therefore, it is an object of the present invention to provide a process for manufacturing pneumatic tires which will overcome the above-noted and other disadvantages.

A further object of the present invention is to provide a novel method for manufacturing pneumatic tires comprising a carcass formed by one or more reinforcing plies, a pair of bead cores, a tread and a reinforcing annular structure between the carcass and tread.

Still, a further object of the present invention is to provide a method using novel apparatus for manufacturing pneumatic tires comprising a carcass formed by one or more reinforcing plies, a pair of bead cores, a tread and a reinforcing annular structure.

SUMMARY OF THE INVENTION

The foregoing objects and others are accomplished in accordance with the present invention, generally speaking, by providing a process whereby a carcass is built up around a first drum in cylindrical configuration and bead cores are applied to the carcass. The carcass is transferred to and around a second expandable drum devoid of a bladder. The carcass is then torically shaped and the sidewalls turned up on the torically shaped carcass. The carcass is transferred telescopically from the first drum to the second drum in the form of a cylindrical tube with the plies wound around each bead core and without turning up the ends of the plies around the bead cores. The second drum comprises expandable parts prearranged with an outer diameter smaller than the smallest inner diameter of the carcass tube.

Direct bearing forces are applied to the tube in a radial sense from the inside of the tube toward the outside through the simultaneous expansion of the expandable parts of the second drum which are arranged symmetrically and in a central position with respect to a mid-circumferential plane perpendicular to the axis of the second drum.

The same expandable parts are axially moved with respect to said plane, continuously applying radial and stretching forces to the inner surface of the tube said carcass being inwardly pressed by the axial movement of the expandable parts, with the expandable parts always remaining in contact with the carcass while sliding from the central position defined above, until the plies become clamped between the axially innermost sides of the bead cores and the expandable parts.

The ends of the tube are further supported by applying direct forces radially from the inside of the tube toward the outside through the expansion of additional expandable parts of the second drum. The ply portions wound around the sides of the bead cores are effectively clamped during the toric shaping of the carcass by the opposing axial forces produced in-between by the expandable parts of the second shaping drum.

Therefore, the essential steps of the process of the present invention relate to the application of radial forces to the carcases tube while contemporaneously axially outwardly expanding the drum from the center toward the zone of the carcass tube shaped around the bead cores and finally applying or developing axially opposing forces on the plies shaped around the bead cores. The first forces, applied through the suitable expandable means of a drum, permit the support and the mechanical centering of the carcass tube with respect to the drum. The second stated axial forces keep the plies closely anchored to the sides of the bead cores and avoids the skidding of the cords during the toric shaping of the carcass.

In accordance with the present invention, a drum is provided devoid of a bladder for the toric shaping of a tire carcass arranged in the form of a cylindrical tube comprising carcass plies would around a pair of bead cores. The drum is characterized by comprising a first pair of two groups of sectors applied around a shaft, the respective groups being symmetrical with respect to a central plane passing perpendicular to the axis of rotation of the drum and a second pair of two further groups of sectors applied around the shaft in an axially outer or lateral position with respect to the first pair. Both pairs of sectors are radially moveable starting from a cylindrical configuration determined by the diameter having a value smaller than the smallest inner diameter of the tube. The two groups of sectors of the first pair are axially movable one with respect to the other, with the groups of contiguous sectors of the two pairs, as a consequence of the radial expansion against the walls of the tube and of the axial approach of the sectors of the first pair toward those of the second pair, determining the means for blocking the carcass plies in a shaped configuration around the sides of the bead cores, the blocking means being axially movable to one another.

BRIEF DESCRIPTION OF THE DRAWINGS

The present invention will be better understood by way of the following detailed description and accompanying drawings which are given by way of illustration only, and thus are not limitative of the present invention, and wherein:

FIG. 1 shows in longitudinal view a tire carcass in the form of a tube supported by a suitable apparatus;

FIG. 2 shows a block diagram relating to the apparatus according to the present invention;

FIG. 3 shows schematically in transverse section a drum for the toric shaping of a carcass of the present invention;

FIG. 4 shows the transfer steps of the carcass tube supported by the apparatus of FIG. 1 with respect to the shaping drum of FIG. 3; and FIGS. 5 and 6 show the centering and blocking steps of the carcass tube on the shaping drum.

DETAILED DESCRIPTION

FIG. 1 shows a carcass 1 for a radial tire, the assembly of the various components having been represented, for the sake of simplicity, by a single layer. In proximity of the carcass ends, two bead cores 2 and 2' of any desired shape are arranged, i.e., two bed cores having a circular or polygonal contour, for example, hexagonal as shown in the figures. In the drawing, still for the sake of simplicity, the eventual elastomeric fillers present in some cases have been omitted. The carcass is represented as a cylindrical tube configuration, with the plies faithfully shaped around the bases and the lateral profiles of the bead cors. Hereinafter the expression "tube" means a cylindrical configuration different from the usual one for a carcass already made around a first step drum in which the plies are turned-up around the bead cores. In fact, as shown in FIG. 1, the ends of the plies are still straight and, therefore, the "tube" intends to define a cylindrical carcass whose plies are not turned-up at the ends.

Heretofore, the shaping of the plies around the bead cores of the carcass has been effected with a rigid collapsible first step drum, whose characteristics will not be shown and described in detail since they are considered conventional and do not constitute the subject of the present invention. The carcass tube is supported by a suitable apparatus comprising a means for removing the carcass from the collapsible drum. The removing means of the tube are of a known type, such as magnetic for carcasses comprising metallic plies or mechanical for any other type of carcass, for example, with jaws acting on the opposite sides of the bead cores or also with suction means acting on the opposite sides of the elastomeric fillers when provided around the bead cores. Only by way of example, FIG. 1 shows a transfer apparatus 3 comprising as removing means a plurality of suction means 4 shown in action on the carcass surface. Clearly, the same elements 4 can be equivalent to gripping means of different type.

In accordance with the present invention, there is described a process for manufacturing a pneumatic tire comprising a radial carcass already arranged in the form of a tube on the apparatus 3 including an annular assembly formed by a reinforcing annular structure and a tread made separately (not shown). The annular structure can be formed, for example, by two layers of metallic cords crossing with one another with angles from 0° to 90°.

The apparatus for implementing the process for mamufacturing the pneumatic tire of the present invention is schematically shown by the block diagram of FIG. 2 and comprises a collapsible rigid first step drum 5, a transfer apparatus 3, a shaping drum 6, an auxiliary drum 7 for making separately the reinforcing annular structure and the tread, a ring 8 for transferring the respective assembly from the auxiliary drum 7 to the shaping drum 6. The shaping drum 6 constitutes the essential aspect of the invention and, in the particular embodiment shown in FIG. 2, the drum is placed on a frame mounted on a platform 9 rotating around a vertical axis so that the shaft of the drum, which is mounted on the cited frame in cantilever fashion and parallel to the ground, upon the rotation of the platform 9, can find itself aligned first with the axis of the tube arranged on the transfer apparatus 3 and then with the axis of the transfer ring 8. The auxiliary drum 7 and the ring 8 comprise aligned axes and constitute a part of the state of the art. Therefore, these devices will not be further described, but only mentioned where considered helpful in understanding the invention.

In a preferred embodiment of the apparatus of the present invention, the angle between the common axis of the drum 7 and ring 8 and the axis of the tube arranged on the apparatus 3 can vary between 75° and 120°, in a horizontal plane parallel to the ground. However, the drum 7 and the ring 8 could be, for example, also at 1800° with respect to the corresponding axis of the apparatus 3 and the drum 5. In particular, according to the example shown in FIG. 2, the angle is conveniently 90°. This arrangement can very advantageously permit the use in a small space of an already existing line relating to the devices 7 and 8 with a drum 6 of a new conception as that of the present invention.

The drum 6 in the most general embodiment (FIG. 3) comprises a first pair of two groups of sectors 10 and 11 applied around a shaft 12 symmetrically with respect to the central plane X—X and a second pair of two further groups of sectors 13 and 14 always applied around the shaft 12, but in an axially outer or lateral position with respect to the first pair. Both of the two stated pairs of sectors are radially movable starting from a cylindrical configuration whose diameter is smaller than the smallest inner diameter $d_1$ (FIG. 1) of the carcass tube 1 up to a value corresponding to the sectors in contact with the inner walls of the tube. The two groups of sectors 10 and 11 are axially movable the one with respect to the other in the axial direction of the drum according to approaching or separating movements with respect to sectors 13 and 14 of the second pair. In particular, the association of the sectors 10 with the sectors 13 and of the sectors 11 with the sectors 14 originates the blocking effect and provides the blocking means for the bead cores and the profiles of these sectors in the radially outer portion so as to tighten as reliably as possible the carcass plies already shaped around the sides and the base of the bead cores. The sectors are preferably made of material having a low friction coefficient in contact with the elastomeric material, for example, stainless steel.

The means which cause the radial movements of the sectors and the axial movements of the sectors of the first pair with respect to the second pair can be of any conventional system relating to the movement of parts of a drum or other apparatus for manufacturing pneumatic tires. In practice, the radial movements could be effected by fluid-dynamic devices comprising stems acting along the shaft of the drum suitable to transmit the horizontal thrust to a lever system or to any suitable mechanism capable on its turn to transform this horizontal thrust into a vertical thrust on the sectors. Alternatively, the radial movement of the sectors could be produced by horizontal and vertical racks or also by the action of a piston along the shaft, together with a cam whose inclinded surface moves integral with a sector. Although there are many possible means for bringing about the radial movement of the sectors, for purposes of the present discussion there is demonstrated in FIG. 3 a group of deformable or expandable elastic bags, respectively 15 and 16, for the sectors of the first pair and 17 and 18 for the sectors of the second pair. As is understandable, the inflation or the deflation of the respective bags permits the radial movement of the various pluralities of the sectors, for example, along suitable guides 19 provided in a radial sense on the sleeves 20 forming the supports of the sectors around the shaft 12.

The means of the axial movements of the sectors of the first pair can be also of any known type, for example, fluid-dynamic or another suitable type. In particular, in FIG. 3 the possible means for causing the axial movement of the sectors are exemplified as two opposite threads 21 and 22 on two sleeves rotatably coupled together so that a rotation of the elements in a certain sense causes the relative approaching or the separation between the two groups of sectors 10 and 11. The rotation of the respective threads can be obtained in any suitable way, for example, with the approaching of particular gears (not shown).

Preferably, as shown in the embodiment of FIG. 3, the sectors 10 and 11 comprise surfaces 23 and 24 corresponding to a lateral portion of the bead cores, while the sectors 13 and 14 comprise surfaces 25 and 26 which substantially support the base and the axially outermost side of the cores. In a further preferred embodiment, the surface of the sectors 13 and 14 corresponding to the respective portions of the bead cores is covered with a layer of expandable elastomeric material. Thus, the apparatus comprises means for turning-up the ends of the plies around the bead cores. These means can be represented in various known ways, for example, with turning-up rollers introduced into the parabolic space formed by the ends of the plies directed away from the drum during rotation, generating a centrifugal effect. Preferably the turning-up means are associated with the sectors 13 and 14 and can comprise expandable small chambers 27 and 28 associated at one end to the supporting sleeves of the sectors as clearly shown in FIG. 3.

Further, the drum 6 comprises means for creating axial movement between the sectors 10 and 13 as they approach each other and sectors 11 and 14 as they approach each other, too, These means, used in the step of torically shaping the carcass, comprise, for example, two fluid-dynamic devices whose stems are set in action in an opposite sense along the shaft 12. In the embodiment of FIG. 3, each stem is in the form of a cylindrical sleeve supporting the two groups of sectors 10, 13 and 11, 14. Also, in a further embodiment, the supports of the sectors 13 and 14 are idle assembled on the sleeves comprising the threads 21 and 22. It is possible to provide further means in order not to pull into rotation the sectors 11, 14 and 13, 10 when the sleeves on which the threads 21 and 22 are obtained rotate. In one embodiment these means could be formed by pins which project through the thrust of a stem from parts connected to fixed frames to be axially directed into suitable conduits passing through the supports of the sectors 11, 14 or 10, 13.

In the manufacturing of a pneumatic tire implementing the apparatus of the present invention, a carcass tube 1 is provided around a rigid first step drum 5, and the plies shaped around the sides of the bead cores, for example, by expanding the reinforcing ply comprised between the bead cores as far as a position comprised between 30 percent and 90 percent, preferably between 50 percent and 70 percent of the maximum dimension of the cross-section of the bead core. The transfer apparatus 3 is placed around the first step drum 5, consequently, the suction means 4 are applied on the carcass 1 and lastly the first step drum 5 is collapsed. Subsequently, the tube 1 is transferred toward the shaping drum 6, already arranged in condition of maximum radial contraction and with sectors 10 and 11 arranged in the condition of maximum axial contraction. Advantageously, the tube 1 is introduced telescopically in a very short time around the drum 6.

The groups of the sectors 10 and 11 are expanded against the inner walls of the tube 1 as indicated by the dashed lines in FIG. 4. During this step the expansion of the sectors overcomes the elastic resistance of circumferential springs (not shown) which keep the sectors in the position of radial contraction. Immediately thereafter, the same groups of sectors begin to slide along the inner walls of the carcass tube with an axial movement of mutual separation of the sectors 10 and 11. The axial movement of the sectors 10 and 11 terminates when the axially outer surfaces 23 and 24 advance into close contact with the carcass plies wound on the axially inner sides of the bead cores 2 and 2' (FIG. 5). During this step, the transfer apparatus 3 has already been moved away from the drum 6 since the tube is supported by the radial forces transmitted against the inner walls of the tube itself by the sectors 10 and 11. The step for axially moving the sectors 10 and 11 toward the sectors 13 and 14 is essential for obtaining a subsequent optimum toric configuration of the carcass.

For various reasons, the planes locating the two bead cores could find themselves in a condition of not being perfectly perpendicular with respect to the axis of the carcass tube 1. For example, in a plane axial to the tube, the transverse sections of the bead cores placed in a lower position with respect to the axis of the tube could be nearer each other than the upper transverse sections of the same bead cores and, practically, the planes of the two bead cores would be convergent with each other toward the lower part. In this condition, the subsequent toric configuration would produce, understandably, a carcass having an unacceptable shape. The process of the present invention avoids advantageously the persistence of this cited drawback. In fact, the thrust axial action of the sectors 10 and 11 causes the mutual separation of the two lower sections of the two bead cores, moving gradually the deformed portion of the plies on the sides of the bead cores in two axially outermost positions with respect to the previous ones as when the planes locating the position of the bead cores are perfectly perpendicular to the axis of the tube. Therefore, the subsequent toric configuration of the carcass is perfectly regular, both in the upper part and in the lower part to the axis of rotation.

Lastly, in a further step, the sectors 13 and 14 are expanded radially advancing the respective surfaces 25 and 26 against the corresponding portions of carcass plies shaped around the bead cores (FIG. 6). At the end of this step, the formation of the bead seats are consequently determined and the tube 1 is firmly fixed to the drum 6.

In the further steps, the further components of the pneumatic tire, i.e., the reinforcing annular structure and the thread, are transported around the shaping drum 6. These further steps take place also advantageously thoroughly automatically. In fact, the reinforcing annular structure and the tread already formed on the auxiliary drum 7, are removed from the drum by means of the transfer ring 8, by methods which are not repeated here for sake of simplicity since they are conveniently known. Subsequently, the ring 8, moved always in the direction of the axis of the drum 7, transfers structure and tread around the drum 6 already rotated through the platform 9 in the position in which the axes of the drums 7 and 6 are conincident. The toric shaping of the carcass then takes place, drawing toward each other along the shaft 12 the sleeve-shaped stems of the two purposely provided fluid-dynamic devices, sending air under pressure into the closed space determined by the carcass and by the elastic continuous portions of the ends of the small chambers 27 and 28, and the carcass being clamped between the sectors to form the two bead seats.

The present invention has the advantage of avoiding skidding of the carcass plies around the bead cores during the step of shaping the carcass into the toric configuration. In fact, the plies have already been deformed around the bead cores before transferring the carcass to the drum 6 and the connection between the plies and bead cores is kept perfect due to the fact that the groups of sectors 10,13 and 11,14 are pushed together one toward the other through means which determine the axial movements of the sectors 10 and 11 along the shaft 12 in the loading and centering steps of the tube 1. Consequently, there results a definite blocking of the carcass plies, which are clamped between the continuous surface of the bead cores 2 and 2' and the surfaces of the sectors forming the respective bead seats. This result could not be achieved with the characteristics of the drums of the state of the art. In fact, in the known drums the bead seats are already preconstituted and if the plies are too rigid, as a consequence, they will tend not to follow closely the profile of the bead seats initiating skiddings during the shaping step.

Here, according to the present invention, the carcass plies have already been deformed so as to follow reliably the sides of the bead cores and the desired geometry is not at all altered during the transfer of the tube 1 from the first step drum 5 to the shaping drum 6 since the characteristics of the drum 6 permit a completely automatic loading of the carcass tube 1 without mechanical interferences of any type.

The drum 6 further permits the formation of the bead seats in separate steps by the subsequent mutual approach of the respective sectors so as not only to receive perfectly the bead cores with the portions of plies wound on their respective sides, but also so as to exert on the respective portions of the plies axial and opposite forces whose intensity can be regulated by the more or less forced screwing of the sectors 10 and 11, by the threads 21 and 22, against the corresponding sectors 13 and 14.

Although a preferred embodiment of the present invention has been described, it is understood that the invention includes in its scope any other alternative embodiments accessible to a technician of this field and derived from the above-disclosed inventive principles. For example, the drum 6 for the toric shaping of the carcass tube can differ from that shown in FIG. 2, such as, for example, the reinforcing annular structure and the tread might be fed directly to the drum 6. Morover, during the toric shaping of the carcass, it is possible to associate with the drum 6 suitable thrusting means or like elements tending to turn-up the ends of the plies.

Although the present invention has been described with respect to a preferred embodiment, it is understood that the invention includes in its scope any other alternative embodiment accessible to one skilled in this field.

What is claimed is:

1. A process for manufacturing pneumatic tires comprising a carcass formed by one or more reinforcing plies, a pair of bead cores, a tread, and a reinforcing annular structure between said carcass and tread, said process comprising the steps of:

building-up in a cylindrical configuration around a first drum a carcass formed of said reinforcing plies inclusive of said bead cores with said plies shaped around said bead cores;

transferring telescopically said carcass in the form of a cylindrical tube from said first drum to a second drum comprising first expandable parts and second expandable parts prearranged around a shaft such that the outer diameter of said parts is smaller than the smallest inner diameter of said cylindrical tube, said expandable parts being arranged symmetrically and in a central position with respect to a mid-circumferential plane perpendicular to the axis of said second drum;

expanding simultaneously said first expandable parts radially from the inside of said tube toward the outside of said tube, thereby applying direct bearing forces medial to said bead cores on the inner surface of the wall of said tube, said first expandable parts also having the capability of axial movement with respect to an axis of said drum;

continually expanding and axially outwardly moving said first expandable parts against said inner surface of said tube such that said first expandable parts slide continuously along said inner surface of the wall of said carcass tube in an axial direction, said first expandable parts remaining in contact with said carcass wall, until said plies become clamped between the axially innermost sides of said bead cores and said first expandable parts; and finally expanding said second expandable parts of said second drum radially from the inside of said tube toward the outside of said tube, thereby applying direct bearing forces lateral to said bead cores on the inner surface of the wall of said tube such that said plies become clamped between the axially outermost sides of said bead cores during the toric shaping of said carcass.

2. The process of claim 1, further including forming separately on an auxiliary drum an assembly formed of said annular reinforcing structure and said tread and transferring said assembly around said carcass after having effected a rotation of said second drum from a position in which the carcass is aligned with the axis of said first drum to a position in which the carcass tube is aligned with said auxiliary drum.

3. The process of claim 1, wherein said first and second expandable parts comprise first and second pairs of two groups of sectors applied around said shaft, said second pair of expandable parts being located in an axially outer position with respect to said first pair.

4. The process of claim 3, wherein said two groups of said first pair of expandable parts are axially movable one with respect to the other in an axial direction of said second drum.

5. The process of claim 1, further including the step of turning-up the ends of said plies around said bead cores.

6. The process of claim 1, wherein surfaces of said first pair of expandable parts in their expanded condition correspond to a lateral portion of the respective bead core and at least a portion of the radially outermost surface of said second pair of expandable parts in the position of maximum expansion corresponds to the base surface and the axially outermost side of said bead cores.

* * * * *